US007594848B2

(12) United States Patent
Thomas

(10) Patent No.: US 7,594,848 B2
(45) Date of Patent: Sep. 29, 2009

(54) GAMING MACHINE WITH PLAYER-OPERATED DISPLAY MECHANISM

(75) Inventor: Alfred Thomas, Las Vegas, NV (US)

(73) Assignee: WMS Gaming, Inc., Waukegan, IL (US)

( * ) Notice: Subject to any disclaimer, the term of this patent is extended or adjusted under 35 U.S.C. 154(b) by 545 days.

(21) Appl. No.: 10/436,453

(22) Filed: May 12, 2003

(65) Prior Publication Data

US 2004/0229674 A1 Nov. 18, 2004

(51) Int. Cl.
*A63F 13/00* (2006.01)

(52) U.S. Cl. ............................ 463/16; 463/37; 463/38

(58) Field of Classification Search .................. 463/16, 463/20–22, 27, 30–32, 37, 38; 273/144 B, 273/146, 145 R, 144
See application file for complete search history.

(56) References Cited

U.S. PATENT DOCUMENTS 4,358,114 A * 11/1982 Burnside ................ 273/143 R
4,373,727 A * 2/1983 Hooker et al. ........... 273/143 R
5,251,898 A * 10/1993 Dickenson et al. ....... 273/143 R
5,472,197 A * 12/1995 Gwiasda et al. ......... 273/143 R
5,758,875 A 6/1998 Giacaione, Jr. .............. 273/143
6,186,894 B1 * 2/2001 Mayeroff ..................... 463/20
6,238,288 B1 5/2001 Walker et al. ................. 463/26
6,481,713 B2 * 11/2002 Perrie et al. ................. 273/146
6,746,328 B2 * 6/2004 Cannon et al. ................ 463/17
6,848,996 B2 * 2/2005 Hecht et al. .................... 463/35
6,935,950 B2 * 8/2005 Tarantino ..................... 463/20
6,942,571 B1 * 9/2005 McAllister et al. ............ 463/20
6,960,134 B2 * 11/2005 Hartl et al. ..................... 463/20
2001/0024970 A1 * 9/2001 McKee et al. ................. 463/16
2001/0034264 A1 * 10/2001 Berman et al. ................ 463/22
2002/0111204 A1 * 8/2002 Lupo ............................. 463/9
2002/0128055 A1 * 9/2002 Adams ........................... 463/6
2002/0169016 A1 * 11/2002 Tarantino ..................... 463/16
2003/0032479 A1 * 2/2003 LeMay et al. ................. 463/32
2003/0078089 A1 * 4/2003 Gray et al. ..................... 463/16
2003/0155708 A1 * 8/2003 Perrie et al. .............. 273/138.1
2004/0053673 A1 * 3/2004 Mishra ........................ 463/20
2004/0053683 A1 * 3/2004 Hartl et al. .................... 463/25

FOREIGN PATENT DOCUMENTS

GB 2100492 A * 12/1982

OTHER PUBLICATIONS

Golden Tee Contest.com Feb. 7, 2003, [online] [retrieved on Feb. 16, 2006]. Retrieved from the Internet: <URL: http://web.archive.org/web/20030207151413/www.goldenteecontest.com/welcome.htm>.*
Delta Force 2 Operations Manual. Oct. 31, 1999. Copyright 1999 NovaLogic, Inc. [retrieved on Feb. 16, 2006]. p. 6.*
"Strike!", Strictly Slots, pp. 60-61, Dec. 1999.

* cited by examiner

*Primary Examiner*—Ronald Laneau
*Assistant Examiner*—Ross A. Williams
(74) *Attorney, Agent, or Firm*—Nixon Peabody LLP

(57) ABSTRACT

A gaming machine for conducting a wagering game includes a mechanical input device and a display mechanism. The input device is manually moved by a player in a first plurality of directions and at a first velocity. In response to the player's movement of the input device, the display mechanism moves in a second plurality of directions and at a second velocity. The second plurality of directions and the second velocity have predetermined associations with the first plurality of directions and the first velocity, respectively. The display mechanism displays an outcome of the wagering game, wherein the outcome is preferably unaffected by the player's movement of the input device.

28 Claims, 10 Drawing Sheets

GAMING MACHINE WITH PLAYER-OPERATED DISPLAY MECHANISM

FIELD OF THE INVENTION

The present invention relates generally to gaming machines and, more particularly, to a gaming machine having a display mechanism coupled to an input device and having movement that follows the input device as it is manually operated by a player.

BACKGROUND OF THE INVENTION

Gaming machines, such as slot machines, video poker machines and the like, have been a cornerstone of the gaming industry for several years. Slot machines generally include three or more symbol-bearing reels. After a player makes a wager and either pulls a handle or presses a "spin" button, the reels are rotated and stopped to place symbols on the reels in visual association with one or more pay lines. If a combination of symbols along an active pay line represents a winning combination, the player is awarded a payout identified on a pay table for that winning combination.

Slot machines are generally available in two different types—video and mechanical. First, a video slot machine simulates the reels and the spinning thereof on a video display. The video display may, for example, be a cathode ray tube (CRT) or liquid crystal display (LCD). Second, a mechanical slot machine includes physical, mechanical slot reels driven by stepper motors. Although some players are attracted to the complex and entertaining graphical images, animations, and play sequences afforded by video slot machines, other players are still drawn to mechanical slot machines because they are generally simpler and/or are perceived to be more trustworthy than video slot machines. Even more generally, it is believed that many players place greater trust in wagering game results provided by mechanical components than game results provided by video components. Many players believe that video components are rigged to provide unfavorable game results.

In addition to the mechanical reels of a mechanical slot machine, secondary mechanical components such as dice, balls, wheels, and reels may be added to either a video or mechanical slot machine to display the results of special game features (e.g., bonus games). Not only are such mechanical components often favored over video displays because of their perceived trustworthiness, such mechanical components can also make attractive displays that offer tremendous advantages in player appeal and excitement. Accordingly, it is desirable to outfit slot machines, whether video or mechanical, with mechanical components for displaying game results.

Basic slot machines allow for only minimal interaction players and the machine. Such minimal interaction may, for example, include selecting a wager amount, selecting a number of pay lines to play, and initiating a spin of slot reels. To increase player appeal, many slot machines now allow for considerable interaction between players and the machine. For example, in many bonus games a player is allowed to select a number of items or control movement of a character presented on a video display. The player receives awards based on the selected items or the movement of the character. Such interactive games provide players with a perception that they can affect or control the game results when, in fact, the game results are still random. Players generally like to feel like they have some control (or "perceived skill") over the game results. Accordingly, it is also desirable for slot machines to provide players with a perception that they can affect or control the game results.

SUMMARY OF THE INVENTION

A gaming machine for conducting a wagering game includes a mechanical input device and a display mechanism. The input device is manually moved by a player in a first plurality of directions and at a first velocity. In response to the player's movement of the input device, the display mechanism moves in a second plurality of directions and at a second velocity. The second plurality of directions and the second velocity have predetermined associations with the first plurality of directions and the first velocity, respectively. The display mechanism displays an outcome of the wagering game, wherein the outcome is preferably unaffected by the player's movement of the input device.

Additional aspects of the invention will be apparent to those of ordinary skill in the art in view of the detailed description of various embodiments, which is made with reference to the drawings, a brief description of which is provided below.

BRIEF DESCRIPTION OF THE DRAWINGS

The foregoing and other advantages of the invention will become apparent upon reading the following detailed description and upon reference to the drawings.

Figure 1:
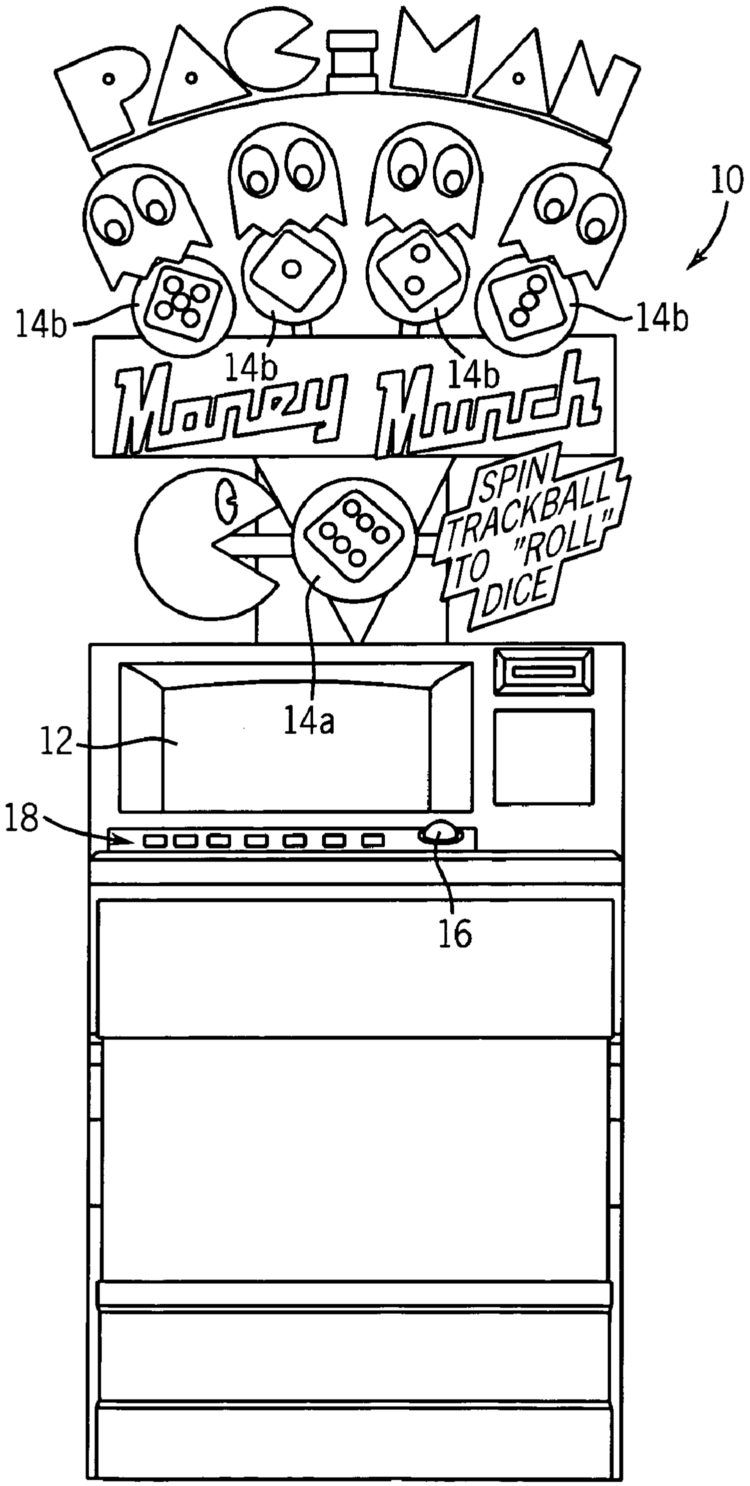
FIG. 1 is a front view of a gaming machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings, FIG. 1 is an isometric view of a gaming machine 10 embodying the present invention. The gaming machine 10 is operable to conduct a video slot game based on a Pac-Man™ theme. Other themes may be applied to the game as well. The gaming machine 10 includes a lower video display 12 and an upper display mechanism 14. The video display 12 is preferably outfitted with a touch screen and may, for example, be a cathode ray tube, liquid crystal display, plasma or other type of video display known in the art. In the illustrated embodiment, the gaming machine is a "slant-top" version in which the display 12 is slanted at about a thirty-degree angle toward the player of the gaming machine 10. Alternatively, the gaming machine 10 may be an "upright" version in which the display 12 is oriented vertically relative to the player. The display mechanism 14 may, for example, be dice, balls, wheels, or reels. In the illustrated example, the display mechanism 14 includes die mechanisms of the type commercially available from Starpoint Electrics Ltd. of the United Kingdom.

Figure 10:
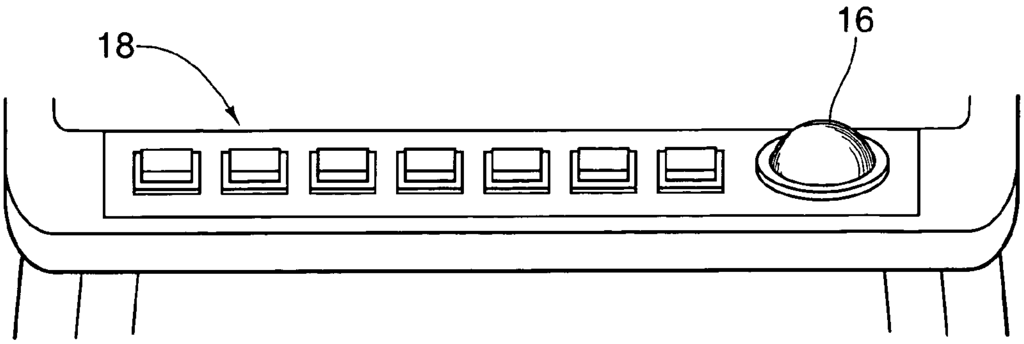
FIG. 10 is a first layout of a user interface including a button panel and a trackball.
Figure 11:
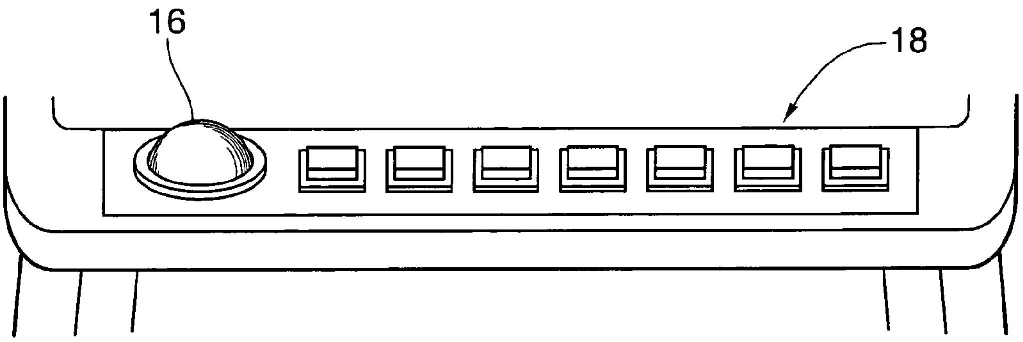
FIG. 11 is a second layout of a user interface including a button panel and a trackball.

To facilitate interaction with the player, the gaming machine 10 includes various player input devices, such as a directional controller 16, button panel 18, and a touch screen mounted over the video display 12. The directional controller 16 may, for example, be a trackball, joystick, wheel, keyboard, mouse, or touch pad. In the illustrated example, the directional controller 16 is a trackball having a diameter of approximately 3 to 4 inches. A trackball is a pointing device that translates the motion of a large ball suspended on rollers to coordinates that are sent to the machine's central processing unit (CPU). A player uses the trackball by rolling the ball with his or her palm or fingers in any direction and at any angular velocity (within the trackball's specifications). The trackball 16 may be incorporated into the button panel 18 on either the right side as shown in FIG. 10 or the left side as shown in FIG. 11. A trackball 16 of the above type is commercially available from Happ Controls of Elk Grove, Ill. As discussed below, the trackball 16 is coupled to the die mechanism **14*a* by the machine's CPU such that the direction and angular velocity of movement of the die mechanism 14*a* follows the respective direction and angular velocity of movement of the trackball 16** for at least a period of time.

Figure 2:
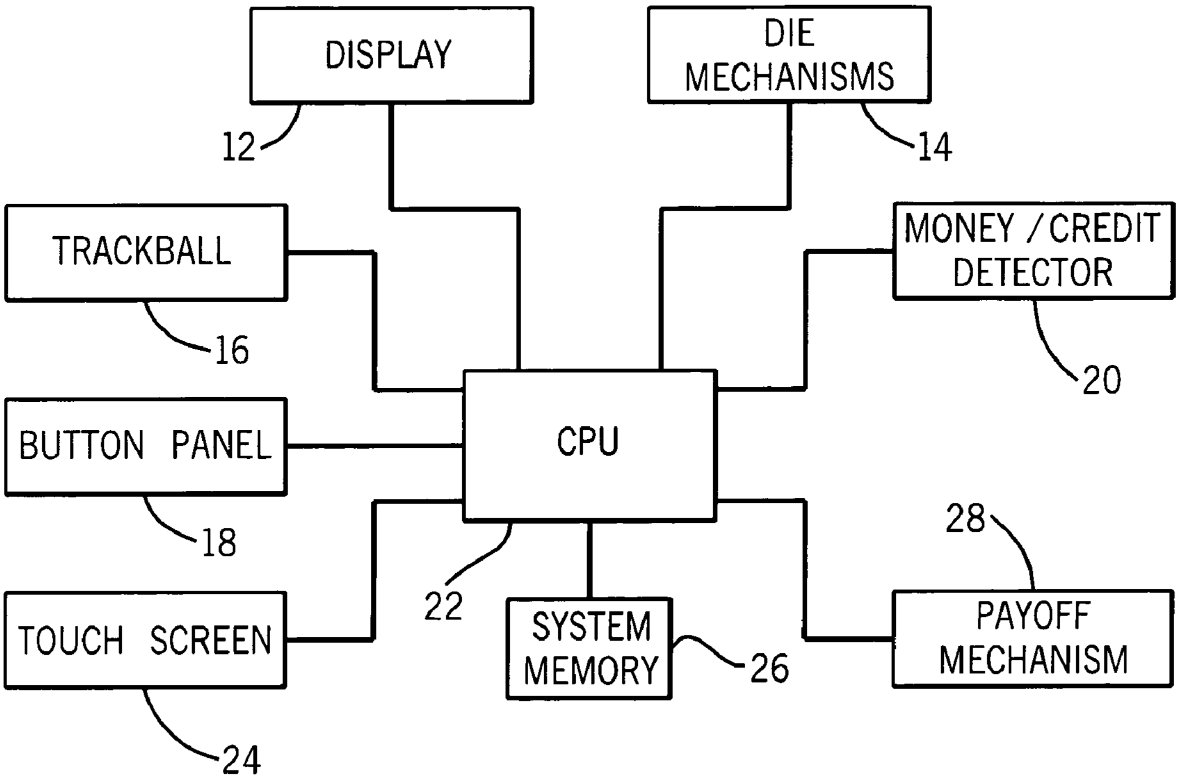
FIG. 2 is a block diagram of a control system suitable for operating the gaming machine.

FIG. 2 is a block diagram of a control system suitable for operating the gaming machine. Money/credit detector 20 signals the CPU 22 when a player has inserted money or played a number of credits. The money may be provided by coins, bills, tickets, coupons, cards, etc. The player may interact with the machine via the trackball 16, the button panel 18, and the touch screen 24 mounted over the video display 12. The button panel 18 and the touch screen 24 may have several buttons in common for accomplishing the same function. The player operates the button panel 18 or the touch screen 24 to select most game options.

During a special game feature triggered by the video slot game, the CPU 22 causes the die mechanisms 14 to display respective die outcomes. The die outcomes indicate a number of positions to be moved by characters on the video display 12 during the game feature. The player operates the trackball 16 to control the direction and angular velocity of movement of the die mechanism **14*a*. The trackball 16 may be connected to the CPU 22** via a communications link such as an RS-232 or USB serial link.

For each play of the game, the CPU 22 generates at least one random event using a random number generator (RNG) and provides an award to the player for a winning outcome of the random event. The CPU 22 operates the video display 12 to represent the random event(s) and outcome(s) in a visual form that can be understood by the player. In addition to the CPU 22, the control system may include one or more additional slave control units for operating the video display 12 and the die mechanisms 14.

A system memory 26 stores control software, operational instructions and data associated with the gaming machine 10. In one embodiment, the system memory 26 comprises read-only memory (ROM), high capacity storage memory (e.g., Compact Flash), serial read-write memory, and battery-backed random-access memory (RAM). However, it will be appreciated that the system memory 26 may be implemented on any of several alternative types of memory structures or may be implemented on a single memory structure. A payoff mechanism 28 is operable in response to instructions from the CPU 22 to award a payoff to the player for outcomes associated with payoffs. The payoff may, for example, be in the form of a number of credits. The number of credits are determined by one or more math tables stored in the system memory 26.

Figure 3:
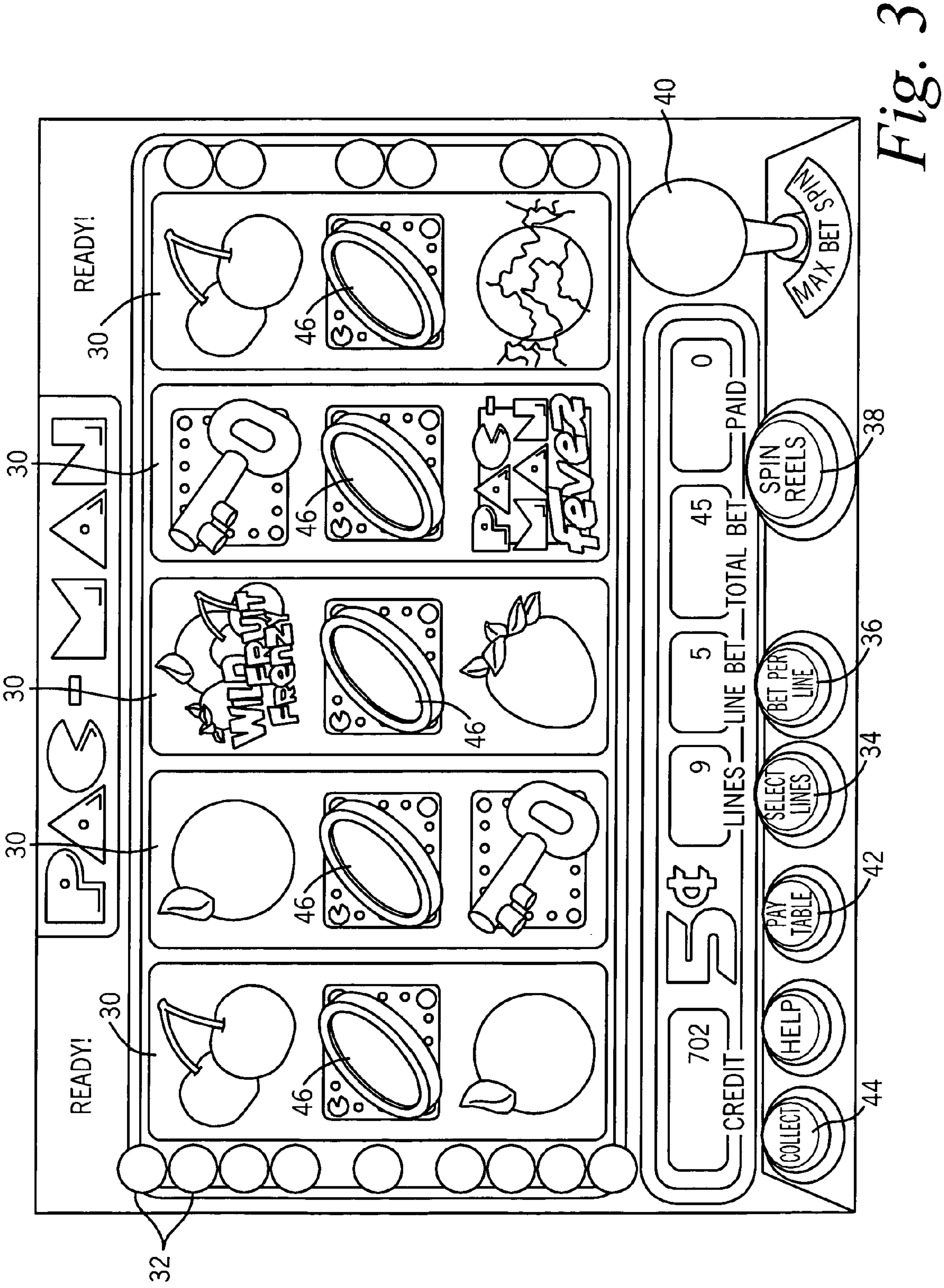
FIG. 3 is a display image associated with a basic slot game and showing a combination of symbols for triggering a special game feature.

Referring to FIG. 3, a basic video slot game is implemented on the display 12 on simulated reels 30 that are rotated and stopped to place symbols on the reels 30 in visual association with a number of pay lines 32. In the illustrated example, the number of reels 30 is five and the number of pay lines 32 is nine, fifteen, or twenty. The number of reels and pay lines may, however, be varied to be more or less than the number illustrated. Also, the video display 12 may be replaced with a mechanical display including a number of physical reels driven by stepper motors. Each of the pay lines 32 extends through one symbol on each of the reels 30.

Generally, game play is initiated by inserting money or playing a number of credits, causing the CPU to activate a number of pay lines corresponding to the amount of money or number of credits played. In one embodiment, the player selects the number of pay lines (between one and nine) to play by pressing a "Select Lines" key 34. The player then chooses the number of coins or credits to wager on the selected pay lines by pressing a "Bet Per Line" key 36. After selecting a number of pay lines and a wager amount, the reels 30 may be set in motion by touching a "Spin Reels" key 38 or, if the player wishes to bet the maximum amount per line, by using a "Max Bet Spin" key 40. Alternatively, other mechanisms such as a lever or push button may be used to set the reels in motion.

The CPU uses a random number generator to select a game outcome (e.g., "basic" game outcome) corresponding to a particular set of reel "stop positions." The CPU then causes each of the video reels 30 to stop at the appropriate stop position. Video symbols are displayed on the reels 30 to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing a "Pay Table" button 42). A winning basic game outcome occurs when the symbols appearing on the reels 30 along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing a "Collect" button 44. In one implementation, the winning combinations start from the leftmost reel and span adjacent reels. In an alternative implementation, the winning combinations start from either the leftmost reel or the rightmost reel and span adjacent reels.

Included among the plurality of basic game outcomes is a start-feature outcome for triggering play of a special game feature. A start-feature outcome may be defined in any number of ways. For example, a start-feature outcome occurs when a special start-feature symbol or a special combination of symbols appears on one or more of the reels 30. The start-feature outcome may require the combination of symbols to appear along an active pay line, or may alternatively require that the combination of symbols appear anywhere on the display regardless of whether the symbols are along an active pay line. The appearance of the appropriate start-feature outcome causes the CPU to shift operation from the basic game to the special game feature. In the illustrated example, the appearance of three or more adjacent MONEY MUNCH symbols 46 along a pay line 32 with a maximum wager triggers the special game feature. The MONEY MUNCH symbols 46 may, for example, be highlighted using a flashing border.

Figure 4:
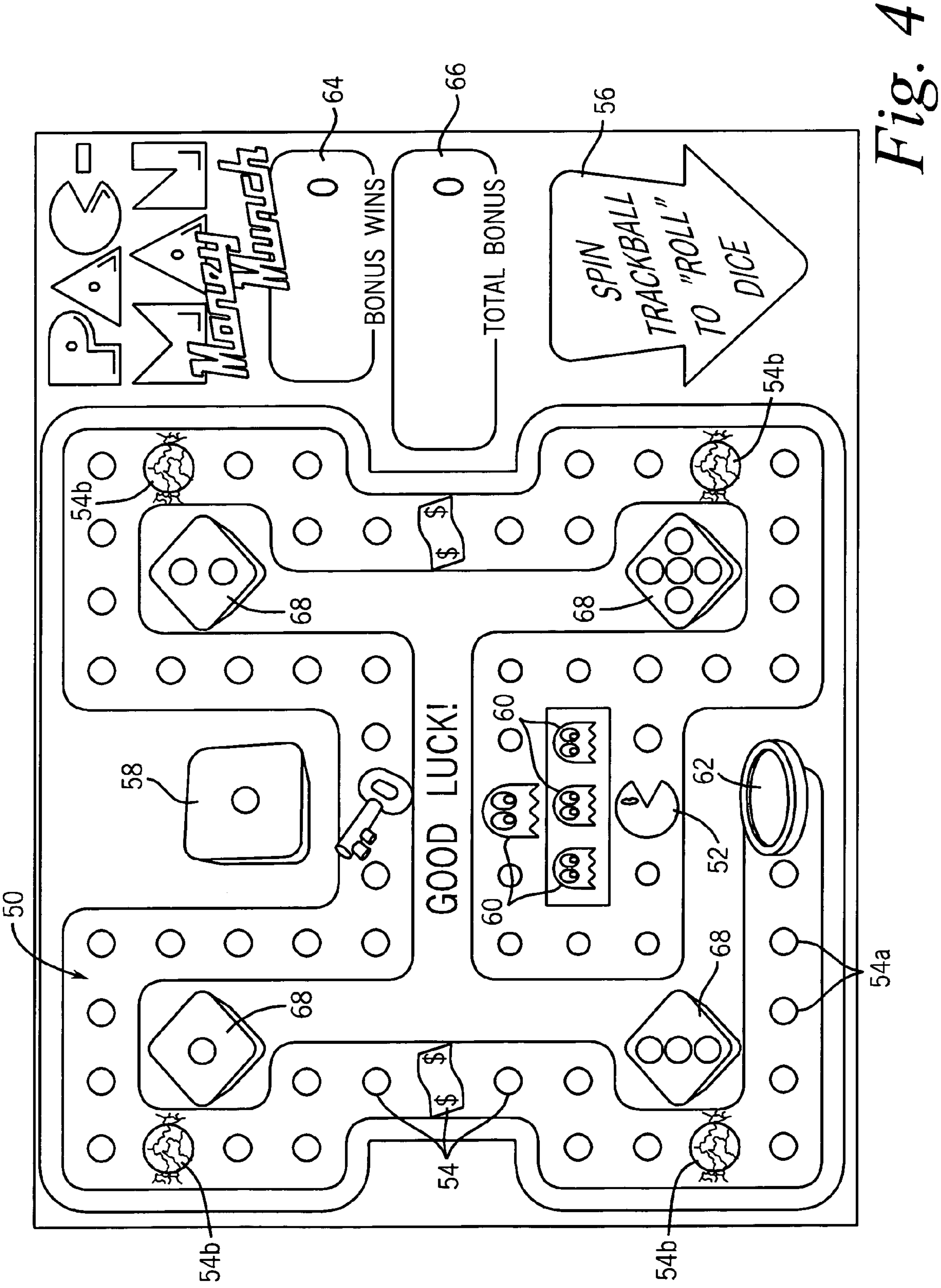
FIGS. 4, 5, 7, 8, and 9 are display images associated with the special game feature.

The special game feature is preferably based on the Pac-Man theme originally made popular on arcade games in the early 1980's. Referring to FIG. 4, upon triggering the special game feature, the image of simulated reels on the video display 12 fades out and is replaced with an image of a path 50. The path 50 is occupied by a bonus-generating character 52 and a plurality of consumable elements 54. The plurality of consumable elements 54 include small dots 54*a*, power pills 54*b*, and miscellaneous other symbols such as cash and fruit. At the commencement of the game feature, the bonus-generating character 52 is placed at starting position along the path 50.

Figure 5:
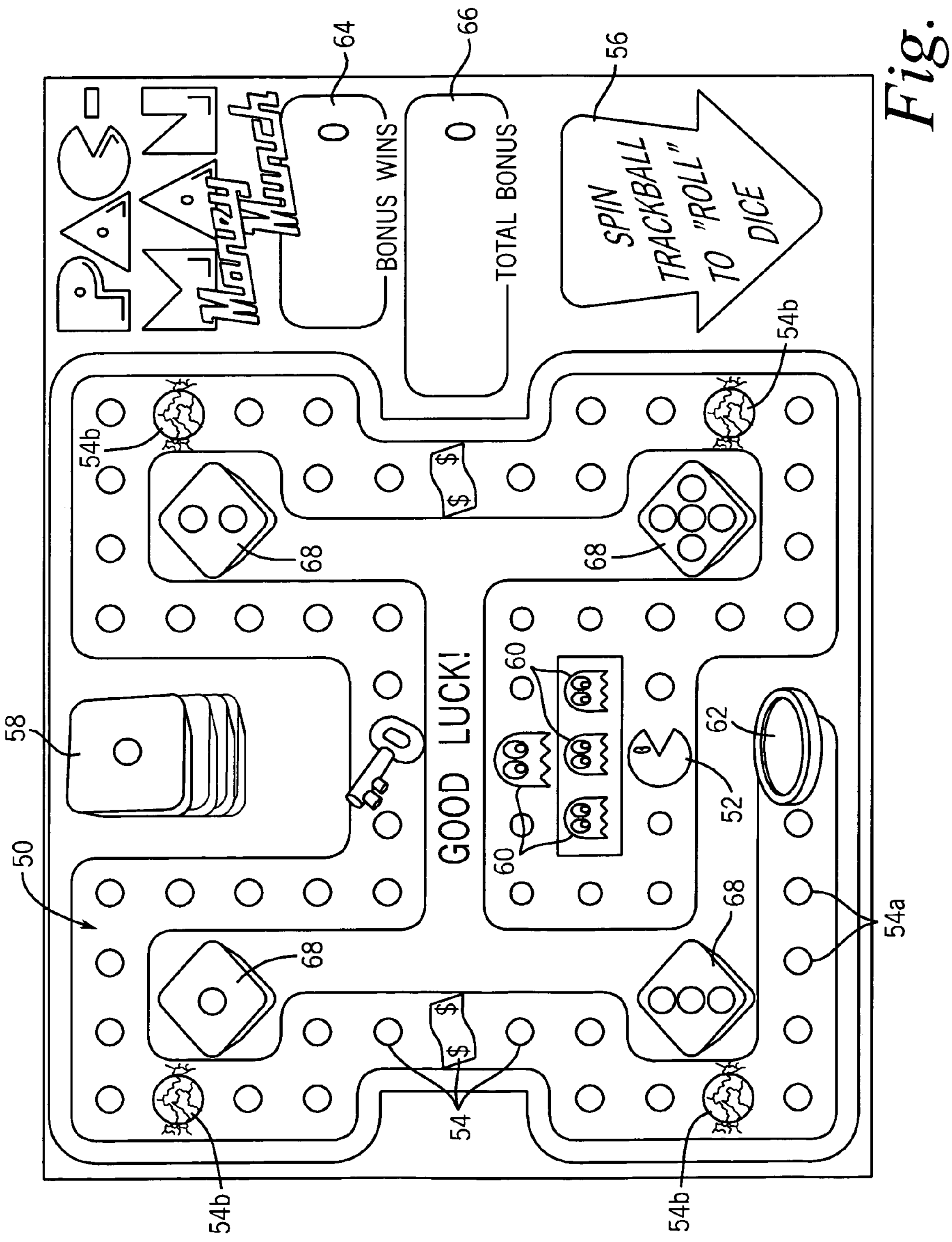

Referring to FIG. 5, an indicator 56 prompts the player to spin the physical trackball 16 (see FIG. 1) located to the right of the button panel 18 in order to initiate a roll of the die mechanism 14*a* (see FIG. 1). A simulated die 58 appears to "launch" off the video display 12 to draw the player's attention to the die mechanism 14*a* (see FIG. 1) located in the machine's top box above the video display 12. Referring back to FIG. 1, the trackball 14 is coupled to the die mechanism 14*a* by the machine's central processing unit (CPU) such that the direction and angular velocity of movement of the die mechanism 14*a* follows the respective direction and angular velocity of movement of the trackball 16 for at least an initial period of time. Thus, the game feature provides players with a perception that they can affect or control the game results when, in fact, the game results are still random as discussed below.

Figure 6:
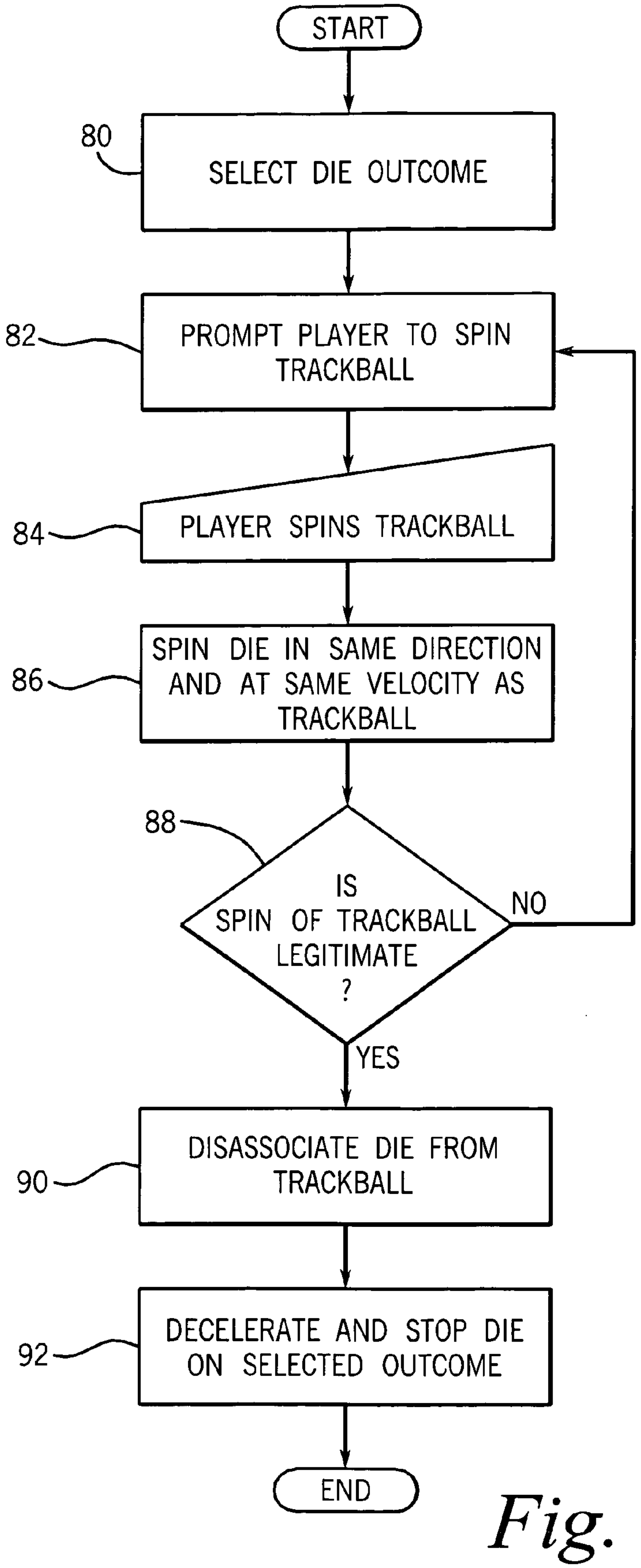
FIG. 6 is a flowchart of a method for operating a die mechanism used in conjunction with the special game feature.

FIG. 6 is a flowchart of a method for operating the die mechanism 14*a*. The CPU randomly selects a die outcome at step 80. The die of the mechanism 14*a* has six faces representing six possible outcomes. As on a conventional die, the six faces have respective numbers of dots representing the numbers one through six. The possible outcomes may be weighted equally such that the probability of selecting each possible outcome is the same (i.e., one out of six). Alternatively, the possible outcomes may be weighted differently such that the probability of selecting one of the outcomes is different from the probability of selecting another of the outcomes. As noted above, the CPU causes the machine to prompt the player to spin the trackball 16 at step 82. The player may, for example, be prompted visually via the video display 12 and audibly via speakers on the machine.

The player manually spins the trackball 16 in any direction and at any angular velocity (within the trackball's specifications) at step 84. In response to the player's movement of the trackball 16, the CPU causes the die mechanism 14*a* to spin in the same direction and at the same angular velocity as the trackball 16 at step 86. The CPU then determines whether or not the player's spin of the trackball 16 is legitimate at step 88. The CPU may consider different factors for determining the legitimacy of the spin. Such factors may, for example, include an angular velocity of the trackball 16, a number of revolutions of the trackball 16, and a period of time for which the trackball 16 has been spinning. If the player's spin of the trackball 16 is not legitimate, the player is repeatedly prompted to spin the trackball 16.

If, however, the player's spin of the trackball 16 is legitimate, the video display in FIG. 5 may visually confirm the same by showing the simulated die 58 fully launched off of the display image. The CPU then disassociates the die mechanism 14*a* from the trackball 16 at step 90 such that the direction and angular velocity of movement of the die mechanism 14*a* no longer follows the respective direction and angular velocity of movement of the trackball 16. Finally, at step 92 the CPU decelerates and stops the die mechanism 14*a* on the die outcome previously selected at step 80. Thus, although the player initially controls the movement of the die mechanism 14*a* by virtue of the player's manipulation of the trackball 16, the CPU ultimately disassociates the die mechanism 14*a* from the trackball 16 to stop the die mechanism 14*a* on an outcome selected by the CPU, not the player.

Figure 7:
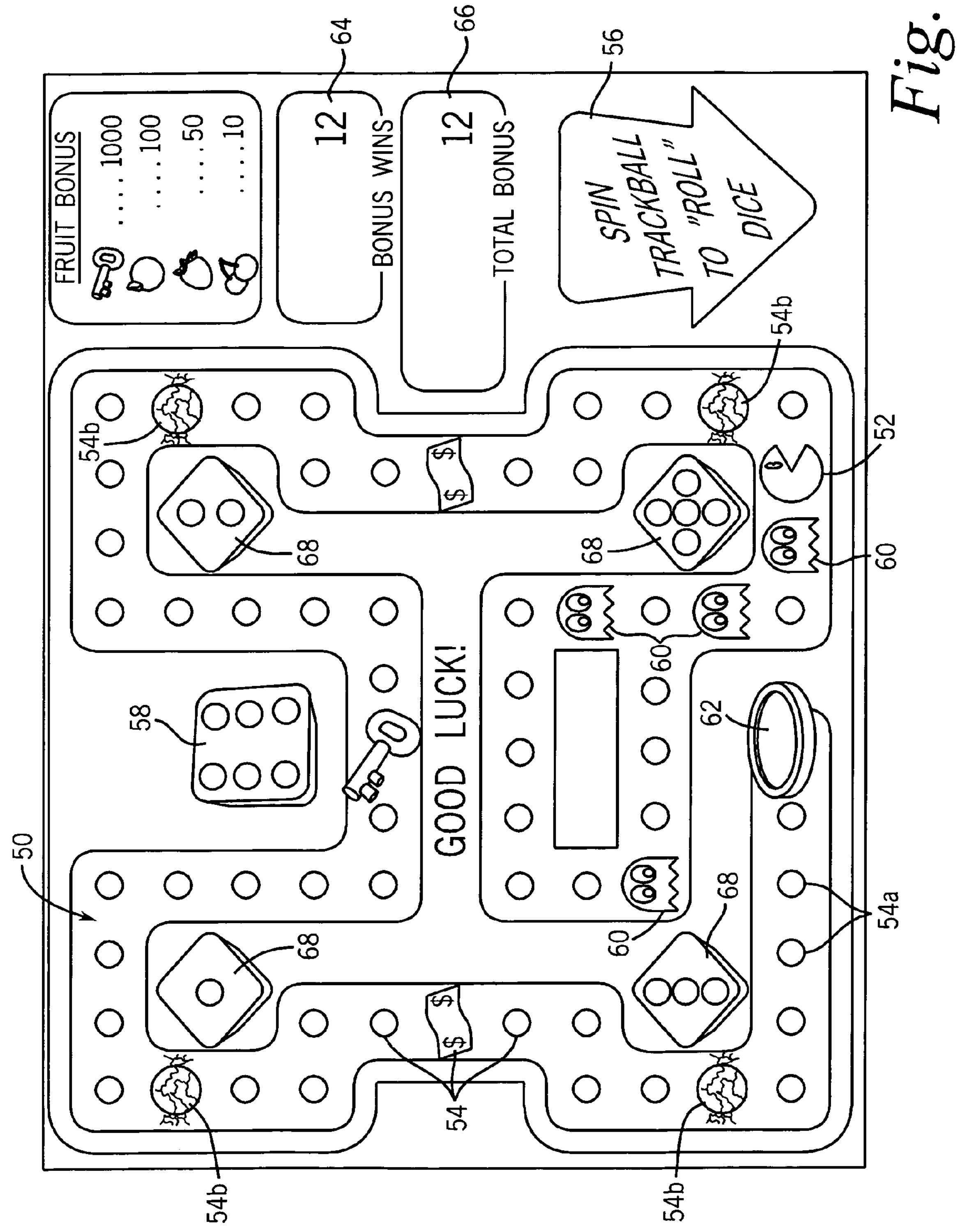

Referring to FIG. 7, the simulated die 58 on the video display 12 also depicts the die outcome shown on the die mechanism 14*a*. In the illustrated example, the die outcome is the number six. The bonus-generating character 52 moves forward along the path 50 toward an ending position 62 by a number of positions corresponding to the die outcome. Each position is representing by a consumable element 54. As the bonus-generating character 52 moves along the path 50, the bonus-generating character 52 visually consumes the elements 54 as it encounters them. The consumed elements may yield respective bonuses such as a number of credits. Some of the elements 54, such as the power pills 54*b*, fruits, and cash, may be worth more than the dots 54*a*. The bonuses resulting from an individual roll of the die mechanism 14*a* (and subsequent movement of the bonus-generating character 52) are accumulated in a "bonus wins" meter 64. The total bonus resulting from all rolls of the die mechanism 14*a* during the game feature is accumulated in a "total bonus" meter 66.

While the bonus-generating character 52 moves along the path 50, the bonus-generating character 52 is pursued by one or more bonus-ending characters 60. The bonus-ending characters 60 are depicted in the illustrated embodiment as ghosts. The game feature generally ends in response to one of the bonus-ending characters 60 "catching up" to the bonus-generating character 52. After the bonus-generating character 52 moves forward along the path 50 according to the die outcome on the die mechanism 14*a*, each bonus-ending character 60 is, in turn, moved forward along the path 50 by a number of positions based on its own respective die roll of its respective die mechanism 14*b* (see FIG. 1). A simulated die 68 on the video display 12 also depicts the die outcome shown on the respective die mechanism 14*b*. Each bonus-ending character 60 is associated with a respective die mechanism 14*b* (see FIG. 1) and a respective simulated die 68 shown on the video display 12. Four different colors may be used to make clear which of the four bonus-ending characters 60 are associated with which of the four die mechanisms 14*b* and four simulated dice 68. The die roll associated with each bonus-ending character 60 is performed by the CPU without any perceived control by the player.

Figure 8:
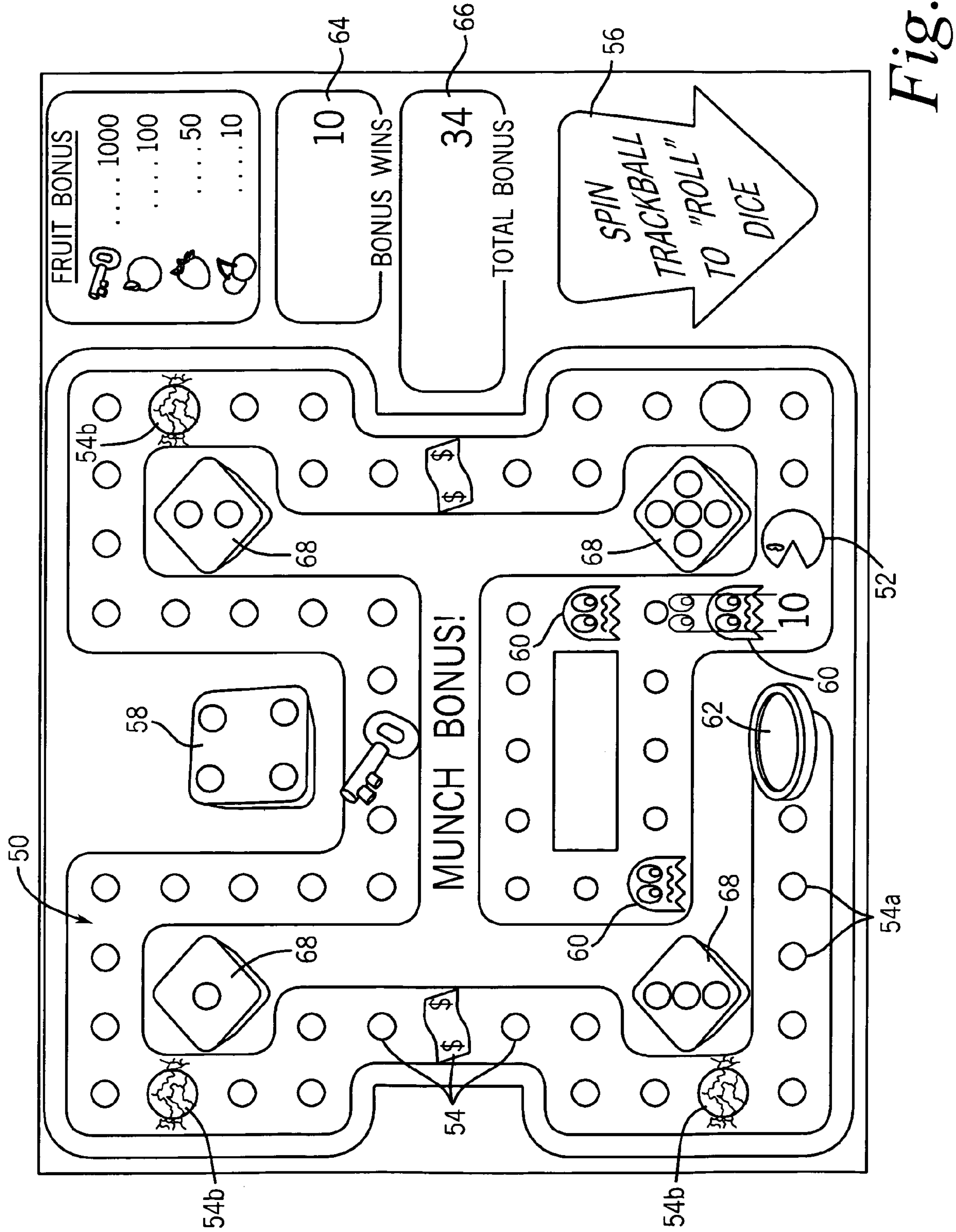

Referring to FIG. 8, when the bonus-generating character 52 consumes a power pill 54*b*, the following events occur. The bonus-generating character 52 reverses its direction. The player is awarded an extra roll of the die mechanism 14*a* (and simulated die 58) to chase the bonus-ending characters 60. All bonus-ending characters 60 (e.g., ghosts) become consumable for this extra roll and yield bonuses if consumed as a result of the roll. While consumable, a bonus-ending character 60 may, for example, have a different shape or color than when non-consumable.

Figure 9:
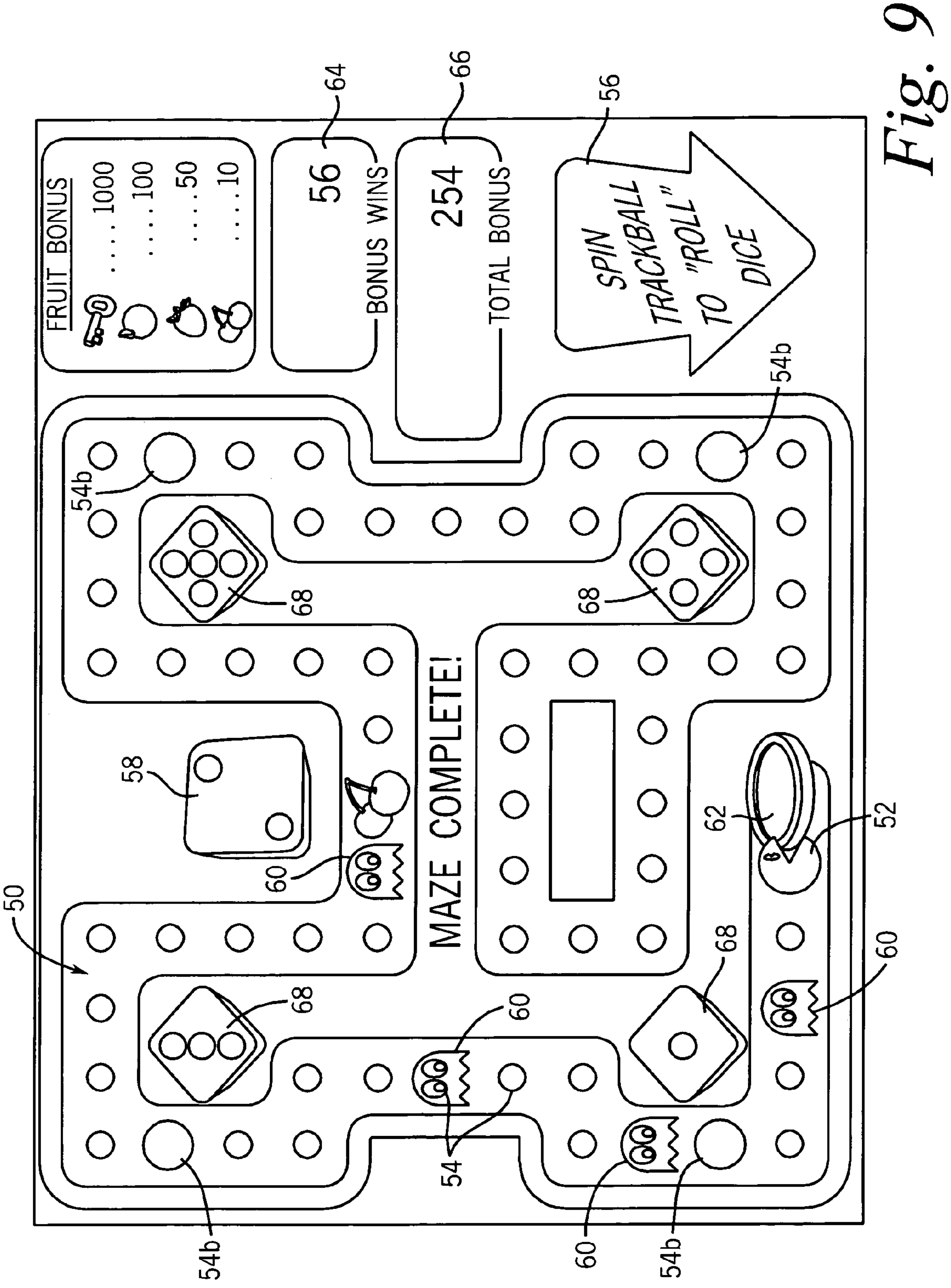

Referring to FIG. 9, the above steps—namely (i) rolling the die mechanism 14*a*, (ii) moving the bonus-generating character 52 forward along the path 50 by the die outcome on the die mechanism 14*a*, (iii) awarding bonuses for elements 54 consumed by the bonus-generating character 52, and (iv) moving the bonus-ending characters 60 forward along the path 50 based on rolls of their own respective die mechanisms 14*b*—are repeated until the bonus-generating character 52 either reaches the ending position 62 or is caught by one of the bonus-ending characters 60, whichever occurs first. When the bonus-generating character 52 either reaches the ending position 62 or is caught by one of the bonus-ending characters 60, the CPU awards the total bonus in the "total bonus" meter 66 and shifts operation from the special game feature back to the basic slot game.

While the present invention has been described with reference to one or more particular embodiments, those skilled in the art will recognize that many changes may be made thereto without departing from the spirit and scope of the present invention.

Figure 12:
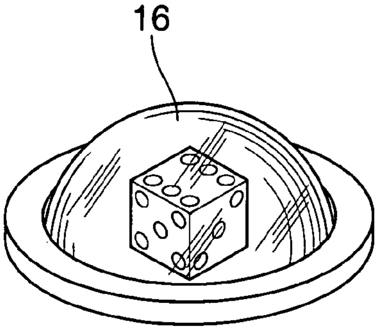
FIG. 12 is a side view of a trackball having a die embedded therein.

For example, as shown in FIG. 12, the trackball 16 may have a die embedded within a transparent ball to further show a correlation between the trackball 16 and the die mechanism 14*a*.

Instead of moving the die mechanism 14*a* in the same direction as the trackball 16 in step 86 of FIG. 6, the die mechanism 14*a* may move in a direction opposite to that of the trackball 16, or in a direction having some other predetermined association to that of the trackball 16.

Instead of rotating the die mechanism 14*a* by the same amount as the trackball 16 in step 86 of FIG. 6 (such that a complete revolution of the trackball 16 results in a complete revolution of the die mechanism 14*a*), the die mechanism 14*a* may rotate by a different amount than the trackball 16 but having some predetermined ratio of rotation (e.g., 2 to 1, 3 to 1, 4 to 1, etc.).

As noted above, the directional controller 16 may be a trackball, joystick, wheel, keyboard, mouse, or touch pad. Depending upon which controller is used, the directional controller 16 may be moved to indicate directions that are linear or curvilinear, to indicate directions that collectively occupy two dimensions or three dimensions, and to indicate rotation about one axis (e.g., an x-axis), two axes (e.g., an x-axis and a y-axis), three axes (e.g., an x-axis, a y-axis, and a z-axis), or more than three axes.

Each of these embodiments and obvious variations thereof is contemplated as falling within the spirit and scope of the claimed invention, which is set forth in the following claims.

What is claimed is:

1. A method of conducting a wagering game on a gaming machine, the gaming machine including a display configured to display an array of randomly selected symbols, a mechanical input device, and a physically movable display mechanism separate from said display, the method comprising:

displaying on said display an array of randomly selected symbols representing a wagering game outcome responsive to an input wager;

allowing the player to manually operate the mechanical input device to indicate a first plurality of different directions during a special game feature triggered by the wagering game outcome;

associating a movement of the mechanical input device and the physically movable display mechanism during a first time period of the special game feature so that the movement of the mechanical input device by the player in any player-selected direction in any of the first plurality of different directions causes an associated and contemporaneous movement of the physically movable display during the first time period of the special game feature;

in response to the movement of the mechanical input device by the player in any player-selected direction in any of the first plurality of different directions during the first time period of the special game feature, moving the physically movable display mechanism, contemporaneously during the first time period with the movement of the mechanical input device by the player, in a second plurality of different directions having a predetermined association with the first plurality of different directions;

disassociating the mechanical input device from said physically movable display mechanism during a second time period of the special game feature after the first time period of the special game feature;

displaying an outcome of the special game feature with the physically movable display mechanism, the outcome being unaffected by the movement of the physically movable display mechanism during the first time period of the special game feature; and awarding an award in accord with the wagering game outcome and the special game feature outcome.

2. The method of claim 1, wherein the first plurality of different directions are the same as respective ones of the second plurality of different directions.

3. The method of claim 1, wherein the first plurality of different directions are different than respective ones of the second plurality of different directions.

4. The method of claim 1, wherein at least one of the first plurality of different directions is linear.

5. The method of claim 1, wherein at least one of the first plurality of different directions is curvilinear.

6. The method of claim 1, wherein the first plurality of different directions collectively occupy two dimensions.

7. The method of claim 1, wherein the first plurality of different directions collectively occupy three dimensions.

8. The method of claim 1, wherein at least one of the first plurality of different directions includes rotation about an axis.

9. The method of claim 1, wherein the first plurality of different directions include rotation about an x-axis, a y-axis, and a z-axis.

10. The method of claim 1, wherein the mechanical input device is selected from a group consisting of a trackball, joystick, wheel, keyboard, mouse, and touch pad.

11. The method of claim 1, wherein the physically movable display mechanism is selected from a group consisting of a die, ball, wheel, and reel.

12. The method of claim 1, wherein the allowing step allows the player to manually operate the mechanical input device to indicate a first velocity, and wherein the moving step moves the physically movable display mechanism at a second velocity associated with the first velocity.

13. The method of claim 12, further including:

after the first velocity reaches a predetermined threshold, displaying an outcome of the wagering game with the physically movable display mechanism, the outcome being unaffected by the allowing step.

14. A gaming machine for conducting a wagering game, comprising:

a display configured to display an array of randomly selected symbols representing a wagering game outcome;

a mechanical input device operable by a player to indicate any direction in a first plurality of different directions;

a physically movable display mechanism responsive, in an initial association between the mechanical input device and the physically movable display mechanism, to operation of the mechanical input device and configured to move in a second plurality of different directions contemporaneously with a movement of the mechanical input device to permit the player to directly control movement of the physically moveable display mechanism during said initial association, the second plurality of different directions having a predetermined association with the first plurality of different directions during said initial association, said physically movable display mechanism being further configured to disassociate from the mechanical input device upon the occurrence of a pre-determined escape condition and display a randomly determined outcome; and a controller configured to award an award in accord with the wagering game outcome and the randomly determined outcome, wherein the randomly determined outcome of the physically movable display mechanism is unaffected by the operation of the mechanical input device by the player, and wherein the mechanical input device is only configured to cause movement of the physically movable display mechanism during the initial association and is not configured to cause movement of any symbol or symbols displayed in the display.

15. The machine of claim 14, wherein the first plurality of different directions are the same as respective ones of the second plurality of different directions.

16. The machine of claim 14, wherein the first plurality of different directions are different from respective ones of the second plurality of different directions.

17. The machine of claim 14, wherein at least one of the first plurality of different directions is linear.

18. The machine of claim 14, wherein at least one of the first plurality of different directions is curvilinear.

19. The machine of claim 14, wherein the first plurality of different directions collectively occupy two dimensions.

20. The machine of claim 14, wherein the first plurality of different directions collectively occupy three dimensions.

21. The machine of claim 14, wherein at least one of the first plurality of different directions includes rotation about an axis.

22. The machine of claim 14, wherein the first plurality of different directions include rotation about an x-axis, a y-axis, and a z-axis.

23. The machine of claim 14, wherein the mechanical input device is selected from a group consisting of a trackball, joystick, wheel, keyboard, mouse, and touch pad.

24. The machine of claim 14, wherein the physically movable display mechanism is selected from a group consisting of a die, ball, wheel, and reel.

25. The machine of claim 14, wherein the mechanical input device is manually operable by the player to indicate a first velocity, and wherein the physically movable display mechanism is configured to move at a second velocity associated with the first velocity.

26. The machine of claim 25, wherein the physically movable display mechanism displays an outcome of the wagering game after the first velocity reaches a predetermined threshold, the outcome being unaffected by the allowing step.

27. A gaming machine for conducting a wagering game, comprising:

a display configured to display, in association with a wagering game, an array of randomly-determined symbols indicative of a wagering game outcome;

a mechanical input device being configured for manipulation by a player in a plurality of different directions, in association with the wagering game, following the display of the wagering game outcome, the mechanical input device being activated only responsive to a predetermined subset of wagering game outcomes that is less than a set of all possible wagering game outcomes;

a physically movable display mechanism, separate from the display, configured to follow the manual movement of the mechanical input device in any direction of movement of the mechanical input device during a first period in which the mechanical input device and the physically movable display mechanism are associated so that manual movement of the mechanical input device in a first direction causes movement of the physically movable display mechanism in a corresponding first direction and a manual movement of the mechanical input device in a second direction causes movement of the physically movable display mechanism in a corresponding second direction, configured to move responsive to a controller input during a second period, subsequent to the first period, in which the physically movable display mechanism is disassociated from the mechanical input device, and configured to stop to reveal a randomly-determined outcome, and a controller configured to both award an award in accord with both the wagering game outcome and in accord with any randomly-determined outcome indicated by the physically movable display mechanism.

28. A method of conducting a wagering game on a gaming machine comprising a display, the method comprising:

displaying in association with a wagering game an array of randomly-determined symbols indicative of a wagering game outcome, and a physically movable display mechanism separate from the display;

activating a physically movable display mechanism;

activating a mechanical input device associated with the physically movable display mechanism;

associating the movement of the mechanical input device with the movement of the movable display mechanism;

allowing the player to manually move the mechanical input device in a plurality of different directions during the wagering game to directly control a movement of the movable display mechanism in any direction in the plurality of different directions in accord with the act of associating;

disassociating the mechanical input device from said physically movable display mechanism upon the occurrence of a pre-determined escape condition to display a randomly-determined outcome;

awarding a first award in accord with the wagering game outcome; and awarding a second award comprising an award associated with the randomly-determined outcome indicated by the physically movable display mechanism.

* * * * *

UNITED STATES PATENT AND TRADEMARK OFFICE

CERTIFICATE OF CORRECTION

PATENT NO. : 7,594,848 B2
APPLICATION NO. : 10/436453
DATED : September 29, 2009
INVENTOR(S) : Alfred Thomas It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1024 days.

Signed and Sealed this

Twenty-eighth Day of September, 2010

David J. Kappos

*Director of the United States Patent and Trademark Office*